United States Patent
Hong et al.

(10) Patent No.: US 10,416,843 B2
(45) Date of Patent: Sep. 17, 2019

(54) ELECTRONIC DEVICE AND METHOD OF CONTROLLING OBJECT IN ELECTRONIC DEVICE

(71) Applicant: Samsung Electronics Co., Ltd., Suwon-si, Gyeonggi-do (KR)

(72) Inventors: Jee-Eun Hong, Seoul (KR);
Kyung-Moon Kwak, Seoul (KR);
Young-Il Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

(21) Appl. No.: 14/877,340

(22) Filed: Oct. 7, 2015

(65) Prior Publication Data
US 2016/0147384 A1    May 26, 2016

(30) Foreign Application Priority Data
Nov. 25, 2014    (KR) .................. 10-2014-0165086

(51) Int. Cl.
| | | |
|---|---|---|
| *G06F 3/048* | (2013.01) | |
| *G06F 3/0482* | (2013.01) | |
| *G06F 3/0484* | (2013.01) | |
| *G06F 3/0481* | (2013.01) | |
| *G06F 9/451* | (2018.01) | |

(52) U.S. Cl.
CPC .......... *G06F 3/0482* (2013.01); *G06F 3/0481* (2013.01); *G06F 3/04817* (2013.01); *G06F 3/04842* (2013.01); *G06F 9/451* (2018.02)

(58) Field of Classification Search
CPC .. G06F 3/0482; G06F 3/0481; G06F 3/04817; G06F 3/04842; G06F 9/4443; G06F 3/048
See application file for complete search history.

(56) References Cited

U.S. PATENT DOCUMENTS

| | | | |
|---|---|---|---|
| 4,586,035 A | 4/1986 | Baker et al. | |
| 5,745,115 A | 4/1998 | Purple et al. | |
| 5,767,850 A | 6/1998 | Ramanathan et al. | |
| 5,999,176 A | 12/1999 | Kamper | |
| 7,882,449 B2* | 2/2011 | Lacock | G06F 3/0482 715/765 |
| 8,769,431 B1* | 7/2014 | Prasad | G06F 3/048 715/788 |
| 9,116,602 B2* | 8/2015 | Kotler | G06F 3/04812 |
| 10,025,462 B1* | 7/2018 | Ledet | G06F 3/0482 |
| 2002/0085037 A1 | 7/2002 | Leavitt et al. | |
| 2004/0212617 A1* | 10/2004 | Fitzmaurice | G06F 3/0481 345/440 |
| 2006/0155441 A1 | 7/2006 | Berg et al. | |

(Continued)

FOREIGN PATENT DOCUMENTS

| | | |
|---|---|---|
| WO | 03/036455 A1 | 5/2003 |
| WO | 2008/104862 A2 | 9/2008 |

*Primary Examiner* — Mahelet Shiberou
(74) *Attorney, Agent, or Firm* — Jefferson IP Law, LLP

(57) ABSTRACT

An electronic device is provided. The electronic device includes a display module functionally connected to the electronic device and an object control module configured to create object property information based on a characteristic of an application and configure and display an object for controlling at least some functions of the application based on the object property information when the application is executed.

20 Claims, 20 Drawing Sheets

(56) References Cited

U.S. PATENT DOCUMENTS

| | | | |
|---|---|---|---|
| 2006/0161870 A1* | 7/2006 | Hotelling | G06F 3/0485 715/863 |
| 2007/0205625 A1 | 9/2007 | Lai et al. | |
| 2007/0236475 A1* | 10/2007 | Wherry | G06F 3/0485 345/173 |
| 2008/0184159 A1 | 7/2008 | Selig | |
| 2009/0083665 A1* | 3/2009 | Anttila | G06F 3/0482 715/834 |
| 2009/0160792 A1 | 6/2009 | Morohoshi et al. | |
| 2009/0189373 A1 | 7/2009 | Schramm et al. | |
| 2009/0327897 A1 | 12/2009 | Serpico et al. | |
| 2010/0107123 A1 | 4/2010 | Sareen et al. | |
| 2010/0122194 A1* | 5/2010 | Rogers | G06F 3/04817 715/769 |
| 2010/0313156 A1 | 12/2010 | Louch et al. | |
| 2011/0113374 A1* | 5/2011 | Sheehan | G06F 3/03547 715/825 |
| 2011/0169749 A1* | 7/2011 | Ganey | G06F 3/04886 345/173 |
| 2012/0044164 A1 | 2/2012 | Kim et al. | |
| 2012/0131495 A1 | 5/2012 | Goossens et al. | |
| 2012/0216146 A1* | 8/2012 | Korkonen | G06F 3/04817 715/835 |
| 2012/0294463 A1* | 11/2012 | Chu | H04M 1/6041 381/150 |
| 2013/0009890 A1* | 1/2013 | Kwon | G06F 3/04886 345/173 |
| 2013/0019172 A1* | 1/2013 | Kotler | G06F 3/0482 715/711 |
| 2013/0019175 A1* | 1/2013 | Kotler | G06F 3/0482 715/728 |
| 2013/0019182 A1* | 1/2013 | Gil | G06F 3/0482 715/738 |
| 2013/0019191 A1* | 1/2013 | Arnold | G06F 3/04886 715/765 |
| 2013/0036379 A1 | 2/2013 | Chang et al. | |
| 2014/0181749 A1 | 6/2014 | Takikawa | |
| 2014/0289642 A1 | 9/2014 | Prasad | |
| 2015/0205455 A1* | 7/2015 | Shaw | G06F 3/0482 715/834 |

* cited by examiner

ELECTRONIC DEVICE AND METHOD OF CONTROLLING OBJECT IN ELECTRONIC DEVICE

CROSS-REFERENCE TO RELATED APPLICATION(S)

This application claims the benefit under 35 U.S.C. § 119(a) of a Korean patent application filed on Nov. 25, 2014 in the Korean Intellectual Property Office and assigned Serial number 10-2014-0165086, the entire disclosure of which is hereby incorporated by reference.

TECHNICAL FIELD

The present disclosure relates to an electronic device and a method of controlling an object in an electronic device. More particularly, the present disclosure relates to a method of controlling an object in an electronic device that can flexibly provide an object for controlling an application based on the characteristic or the state of the application.

BACKGROUND

Electronic devices provide various types of applications. When each of the applications is executed, the electronic devices provide menus or buttons for controlling the application.

Since the locations of the menus or buttons provided during the execution of the application are fixed, it may be impossible to enter an input using the menus or buttons in a specific situation. Further, since the types of menus or buttons provided during the execution of the application are also fixed, the menus or buttons are not flexibly provided according to the state of the application or a user pattern in which the application is used.

Therefore, a need exists for an electronic device and a method of controlling an object in an electronic device that can flexibly provide an object for controlling an application based on the characteristic or the state of the application.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method of controlling an object in an electronic device that can flexibly provide an object for controlling an application based on the characteristic or the state of the application.

In accordance with an aspect of the present disclosure, an electronic device is provided. The electronic device includes a display module functionally connected to the electronic device and an object control module configured to create object property information based on a characteristic of an application, and configure and display an object for controlling at least some functions of the application based on the object property information when the application is executed.

In accordance with another aspect of the present disclosure, a method of controlling an object in an electronic device is provided. The method includes creating object property information based on a characteristic of an application when the application is executed and configuring and displaying an object for controlling at least some functions of the application based on the object property information.

According to the various embodiments of the present disclosure, the electronic device and the method of controlling an object in an electronic device can flexibly provide an object that can control an application based on the characteristic and state of the application, thereby controlling the application in a convenient manner.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
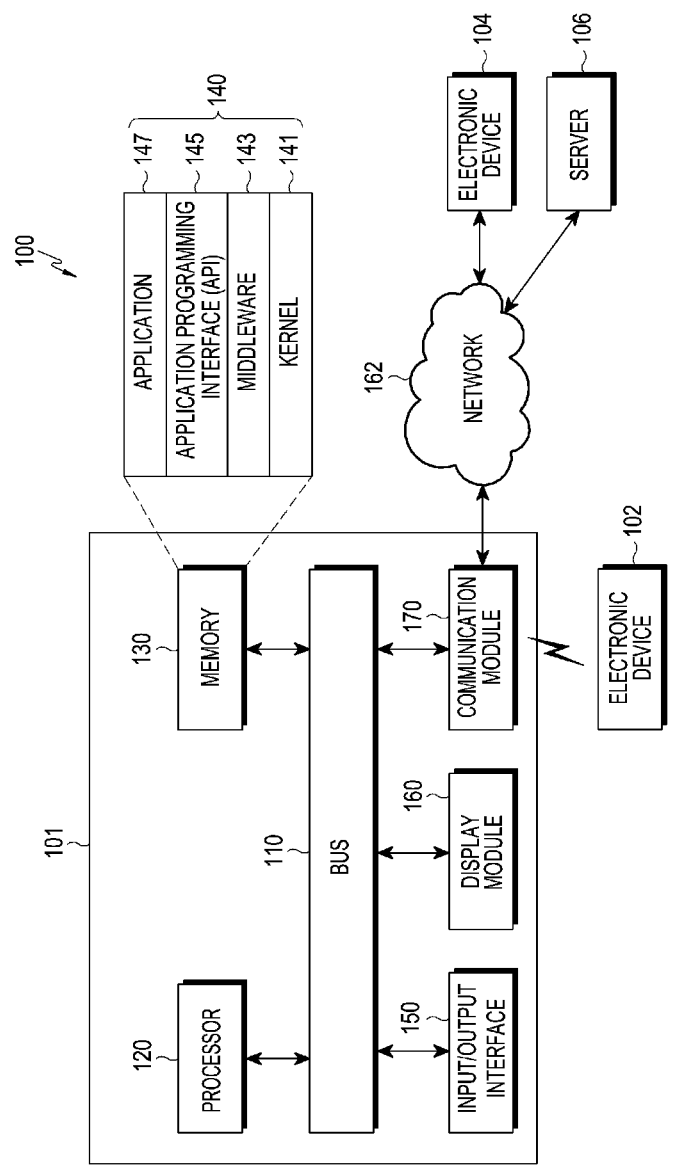
FIG. 1 illustrates a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used herein, the expression "have", "may have", "include", or "may include" refers to the existence of a corresponding feature (for example, a numeral, a function, an operation, a constituent element, such as a component, and the like), and does not exclude one or more additional features.

As used herein, the expression "A or B", "at least one of A and/or B", or "one or more of A and/or B" may include any or all possible combinations of items enumerated together. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the present disclosure may modify various components regardless of the order and/or the importance but does not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure.

When it is mentioned that one element (for example, a first element) is "(operatively or communicatively) coupled with/to or connected to" another element (for example, a second element), it should be construed that the one element is directly connected to the another element or the one element is indirectly connected to the another element via yet another element (for example, a third element). In contrast, it may be understood that when an element (for example, the first element) is referred to as being "directly connected," or "directly coupled" to another element (second element), there are no element (for example, the third element) interposed between them.

The expression "configured to" used in embodiments of the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (for example, an embedded processor) only for performing the corresponding operations or a generic-purpose processor (for example, a central processing unit (CPU) or an application processor (AP)) that can perform the corresponding operations by executing one or more software programs stored in a memory device.

Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in embodiments of the present disclosure. In some cases, even the term defined in embodiments of the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), a moving picture experts group phase 1 or phase 2 (MPEG-1 or MPEG-2) audio layer 3 (MP3) player, a mobile medical appliance, a camera, and a wearable device (for example, a head-mounted-device (HMD), such as electronic glasses, electronic clothes, an electronic bracelet, an electronic necklace, an electronic accessory, electronic tattoos, a smart watch, and the like).

According to various embodiments of the present disclosure, the electronic device may be a smart home appliance. The home appliance may include at least one of, for example, a television (TV), a digital video disc (DVD) player, an audio, a refrigerator, an air conditioner, a vacuum cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™ and PlayStation™), an electronic dictionary, an electronic key, a camcorder, and an electronic photo frame.

According to another embodiment of the present disclosure, the electronic device may include at least one of various medical devices (for example, various portable medical measuring devices (a blood glucose monitoring device, a heart rate monitoring device, a blood pressure measuring device, a body temperature measuring device, and the like), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (for example, a navigation device for a ship, and a gyro-compass), avionics, security devices, an automotive head unit, a robot for home or industry, an automatic teller's machine (ATM) in banks, point of sales (POS) in a shop, or Internet device of things (for example, a light bulb, various sensors, electric or gas meter, a sprinkler device, a fire alarm, a thermostat, a streetlamp, a toaster, a sporting goods, a hot water tank, a heater, a boiler, and the like).

According to various embodiments of the present disclosure, the electronic device may include at least one of a part of furniture or a building/structure, an electronic board, an electronic signature receiving device, a projector, and various kinds of measuring instruments (for example, a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (for example, an artificial intelligence electronic device) that uses an electronic device.

FIG. 1 illustrates a network environment according to various embodiments of the present disclosure.

Referring to FIG. 1, an electronic device 101 in a network environment 100, according to various embodiments of the present disclosure. The electronic device 101 may include a bus 110, a processor 120, a memory 130, an input/output interface 150, a display 160, and a communication module 170. In some embodiments of the present disclosure, the electronic device 101 may omit at least some of the above components or further include other components.

The bus 110 may include, for example, a circuit for connecting the elements 110 to 170 each other and transferring communication (for example, a control message and/or data) between the elements.

The processor 120 may include one or more of a CPU, an AP, and a communication processor (CP). The processor 120 may control, for example, one or more other components of the electronic device 101 and/or process an operation or data related to communication.

The memory 130 may include a volatile memory and/or a non-volatile memory. The memory 130 may store, for example, instructions or data related to at least one other component of the electronic device 101. According to an embodiment of the present disclosure, the memory 130 may store software and/or a program 140. The program 140 may include a kernel 141, middleware 143, an application programming interface (API) 145, and/or an application program (or application) 147. At least some of the kernel 141, the middle 143, and the API 145 may be referred to as an operating system (OS).

The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application program 147 may access individual components of the electronic device 101 to control or manage system resources.

The middleware 143 may serve as an intermediary such that, for example, the API 145 or the application program 147 communicate with the kernel 141 to transmit/receive data. Furthermore, in regard to task requests received from the application program 147, the middleware 143 may perform a control (for example, scheduling or load balancing) for the task requests using, for example, a method of assigning a priority for using the system resources (for example, the bus 110, the processor 120, or the memory 130) of the electronic device 101 to at least one application.

The API 145 is an interface by which the applications 147 control functions provided from the kernel 141 or the middleware 143, and may include, for example, at least one interface or function (for example, instructions) for file control, window control, image processing, or text control.

The input/output interface 150 may serve as an interface which can transmit commands or data input from the user or another external device to other component(s) of the electronic device 101. Further, the input/output interface 150 may output commands or data received from another component(s) of the electronic device 101 to the user or another external device.

The display 160 may include, for example, a liquid crystal display (LCD), a light emitting diode (LED) display, an organic LED (OLED) display, a micro electro mechanical system (MEMS) display, or an electronic paper display. The display 160 may display various types of contents (for example, a text, images, videos, icons, or symbols) for users. The display 160 may include a touch screen, and may receive, for example, a touch, gesture, proximity, or hovering input using an electronic pen or a user's body part.

The communication module 170 may configure communication between, for example, the electronic device and an external device (for example, a first external electronic device 102, a second external electronic device 104, or a server 106). For example, the communication module 170 may be connected to a network 162 through wireless or wired communication to communicate with the external device (for example, the second external electronic device 104 or the server 106).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM), for example, as a cellular communication protocol. The wired communication may include at least one of, for example, a universal serial bus (USB), a high definition multimedia interface (HDMI), recommended standard 232 (RS-232), and a plain old telephone service (POTS). The network 162 may include at least one of communication networks, such as a computer network (for example, a local area network (LAN) or a wide area network (WAN)), the Internet, and a telephone network.

Each of the first external electronic device 102 and the second external electronic device 104 may be a device which is the same as or different from the electronic device 101. According to an embodiment of the present disclosure, the server 106 may include a group of one or more servers. According to various embodiments of the present disclosure, all or some of the operations performed by the electronic device 101 may be performed by another electronic device or a plurality of electronic devices (for example, the first external electronic device 102 and the second external electronic device 104 or the server 106). According to an embodiment of the present disclosure, when the electronic device 101 should perform some functions or services automatically or by request, the electronic device 101 may make a request for performing at least some of the functions related to the functions or services to another device (for example, the first external electronic device 102 or the second external electronic device 104 or the server 106) instead of performing the functions or services by itself. Another electronic device (for example, the first external electronic device 102 and the second external electronic device 104 or the server 106) may execute the requested functions or additional functions, and transmit a result thereof to the electronic device 101. The electronic device 101 may provide the requested functions or services based on the received result as it is or after additionally processing the received result. To achieve this, for example, cloud computing, distributed computing, or client-server computing technology may be used.

Figure 2:
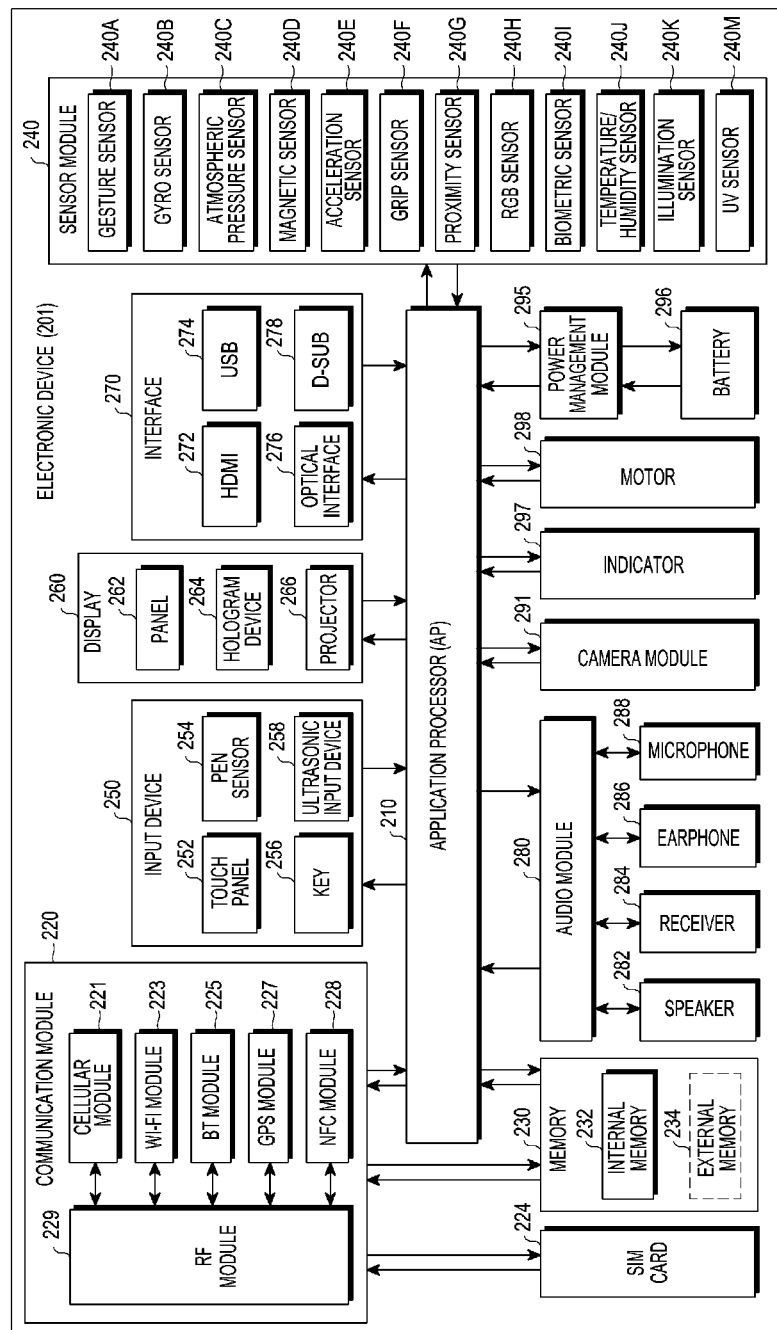
FIG. 2 is a block diagram illustrating a configuration of an electronic device according to various embodiments of the present disclosure.

FIG. 2 is a block diagram illustrating a configuration of an electronic apparatus according to various embodiments of the present disclosure.

Referring to FIG. 2, an electronic device 201 may include, for example, all or some of the electronic device 101 illustrated in FIG. 1. The electronic device 201 may include at least one AP 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may control a plurality of hardware or software components connected thereto by driving an OS or an application program and perform a variety of data processing and calculations. The AP 210 may be embodied as, for example, a system on chip (SoC). According to an embodiment of the present disclosure, the AP 210 may further include a graphics processing unit (GPU) and/or an image signal processor. The AP 210 may include at least some of the components (for example, a cellular module 221) illustrated in FIG. 2. The AP 210 may load instructions or data, received from at least one other element (for example, a non-volatile memory), in a volatile memory to process the loaded instructions or data and may store various types of data in a non-volatile memory.

The communication module 220 may have a configuration equal or similar to the communication module 170 of FIG. 1. The communication module 220 may include, for example, the cellular module 221, a Wi-Fi module 223, a Bluetooth (BT) module 225, a GPS module 227, a near field communication (NFC) module 228, and a radio frequency (RF) module 229.

The cellular module 221 may provide a voice call, video call, text message services, or Internet services through, for example, a communication network. According to an embodiment of the present disclosure, the cellular module 221 may distinguish between and authenticate electronic devices 201 within a communication network using a SIM (for example, the SIM card 224). According to an embodiment of the present disclosure, the cellular module 221 may perform at least some of the functions which may be provided by the AP 210. According to an embodiment of the present disclosure, the cellular module 221 may include a CP.

The Wi-Fi module 223, the BT module 225, the GPS module 227, and the NFC module 228 may include, for example, a processor for processing data transmitted/received through the corresponding module. According to some embodiments of the present disclosure, at least some (two or more) of the cellular module 221, the Wi-Fi module 223, the BT module 225, the GPS module 227, and the NFC module 228 may be included in one integrated chip (IC) or IC package.

The RF module 229 may transmit/receive, for example, a communication signal (for example, an RF signal). The RF module 229 may include, for example, a transceiver, a power amplifier module (PAM), a frequency filter, a low noise amplifier (LNA) or an antenna. According to another embodiment of the present disclosure, at least one of the cellular module 221, the Wi-Fi module 223, the BT module 225, the GPS (global navigation satellite system (GNSS)) module 227, and the NFC module 228 may transmit and receive RF signals through a separate RF module.

The SIM card 224 may include, for example, a card including a subscriber identification module and/or an embedded SIM, and may further include unique identification information (for example, an integrated circuit card identifier (ICCID)) or subscriber information (for example, international mobile subscriber identity (IMSI)).

The memory 230 may include, for example, an internal memory 232 or an external memory 234. The internal memory 232 may include at least one of a volatile memory (for example, a dynamic random access memory (DRAM), a static RAM (SRAM), a synchronous dynamic RAM (SDRAM), and the like) and a non-volatile memory (for example, a one time programmable read only memory (OTPROM), a programmable ROM (PROM), an erasable and programmable ROM (EPROM), an electrically erasable and programmable ROM (EEPROM), a mask ROM, a flash ROM, a flash memory (for example, a NAND flash memory or a NOR flash memory), a hard disc drive, a solid state drive (SSD), and the like).

The external memory 234 may further include a flash drive, for example, a compact flash (CF), a secure digital (SD), a micro-SD, a mini-SD, an extreme digital (xD), a memory stick, and the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, red, green, and blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris scanner, and/or a fingerprint sensor. The sensor module 240 may further include a control circuit for controlling at least one sensor included therein. In some embodiments of the present disclosure, the electronic device 201 may further include a processor configured to control the sensor module 240 as a part of or separately from the AP 210, and may control the sensor module 240 while the AP 210 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. The touch panel 252 may further include a control circuit. The touch panel 252 may further include a tactile layer, and provide a tactile reaction to a user.

The (digital) pen sensor 254 may include, for example, a recognition sheet which is a part of the touch panel or a separate recognition sheet. The key 256 may include, for example, a physical button, an optical key, or a keypad. The ultrasonic input device 258 may detect an acoustic wave using a microphone (for example, the microphone 288) of the electronic device 201 through an input tool generating an ultrasonic signal to identify data.

The display 260 (for example, the display 160) may include a panel 262, a hologram device 264, or a projector 266. The panel 262 may include a component equal or similar to the display 160 of FIG. 1. The panel 262 may be embodied to be, for example, flexible, transparent, or wearable. The panel 262 may also be configured to be integrated with the touch panel 252 as a single module. The hologram device 264 may show a stereoscopic image in the air by using interference of light. The projector 266 may project light onto a screen to display an image. The screen may be located, for example, inside or outside the electronic device 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270 may be included in, for example, the communication module 170 illustrated in FIG. 1. Additionally or alternatively, the interface 270 may include, for example, a mobile high-definition link (MHL) interface, a SD card/multi-media card (MMC) interface, or an Infrared Data Association (IrDA) standard interface.

The audio module 280 may bilaterally convert, for example, a sound and an electrical signal. At least some components of the audio module 280 may be included in, for example, the input/output interface 140 illustrated in FIG. 1. The audio module 280 may process sound information input or output through, for example, a speaker 282, a receiver 284, earphones 286, the microphone 288, and the like.

The camera module 291 is a device which may photograph a still image and a dynamic image. According to an embodiment of the present disclosure, the camera module 291 may include one or more image sensors (for example, a front sensor or a back sensor), a lens, an image signal processor (ISP) or a flash (for example, LED or xenon lamp).

The power management module 295 may manage, for example, power of the electronic device 201. According to an embodiment of the present disclosure, the power management module 295 may include a power management integrated circuit (PMIC), a charger IC, or a battery or fuel gauge. The PMIC may have a wired and/or wireless charging scheme. Examples of the wireless charging method may include, for example, a magnetic resonance method, a magnetic induction method, an electromagnetic method, and the like. Additional circuits (for example, a coil loop, a resonance circuit, a rectifier, and the like) for wireless charging may be further included. The battery gauge may measure, for example, the remaining amount of battery, a charging voltage, current, or temperature. The battery 296 may include, for example, a rechargeable battery and/or a solar battery.

The indicator 297 may show particular statuses of the electronic device 201 or a part (for example, AP 210) of the electronic device 201, for example, a booting status, a message status, a charging status, and the like. The motor 298 may convert an electrical signal into mechanical vibrations, and may generate a vibration or haptic effect. Although not illustrated, the electronic device 201 may include a processing unit (for example, a GPU) for supporting mobile TV. The processing device for supporting mobile TV may process media data according to a standard of digital multimedia broadcasting (DMB), digital video broadcasting (DVB), media flow, and the like.

Each of the components of the electronic device, according to an embodiment of the present disclosure, may be implemented by one or more components and the name of the corresponding component may vary depending on a type of the electronic device. In various embodiments of the present disclosure, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

Figure 3:
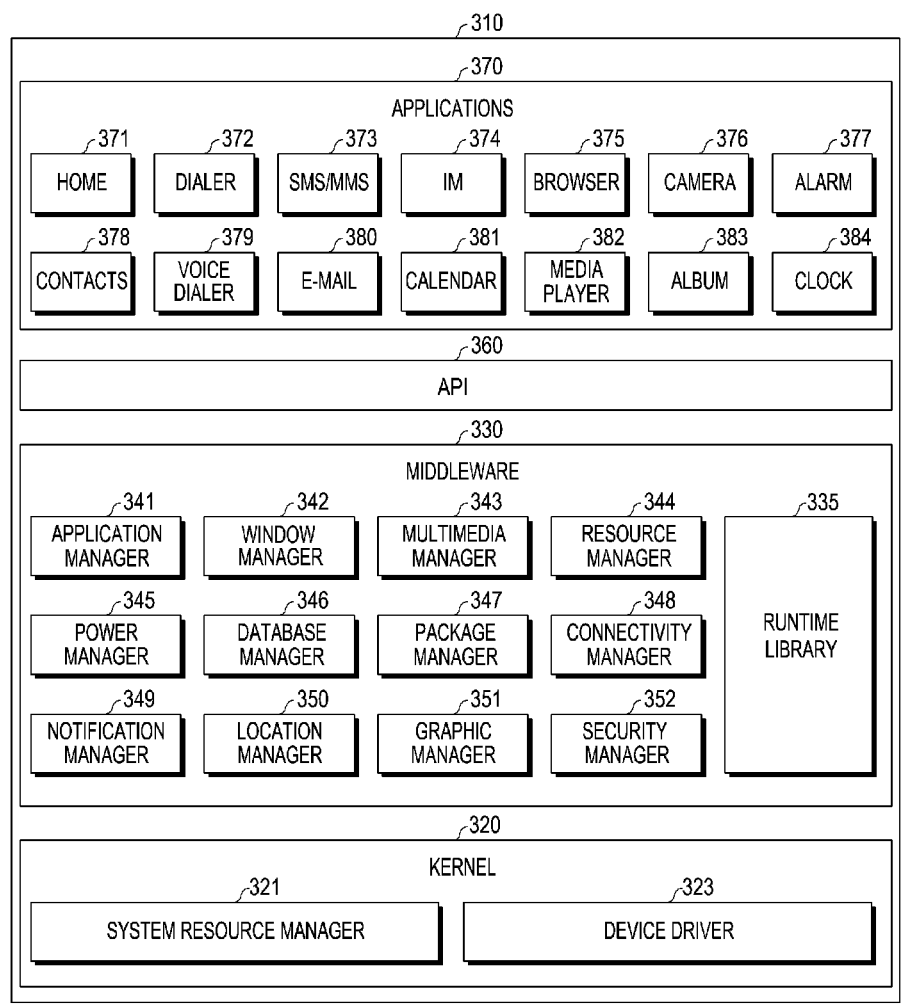
FIG. 3 is a block diagram illustrating a program module according to various embodiments of the present disclosure.

FIG. 3 is a block diagram illustrating a program module according to various embodiments of the present disclosure.

Referring to FIG. 3, according to an embodiment of the present disclosure, a program module 310 (for example, the program 140) may include an OS for controlling resources related to the electronic device (for example, the electronic device 101) and/or various applications (for example, the application programs 147) executed in the OS. The OS may be, for example, Android, iOS, Windows, Symbian, Tizen, Bada, and the like.

The programming module 310 may include a kernel 320, middleware 330, an API 360, and/or applications 370. At least some of the program module 310 may be preloaded in the electronic device or downloaded in a server (for example, the server 106).

The kernel 320 (for example, the kernel 141 of FIG. 1) may include, for example, a system resource manager 321 or a device driver 323. The system resource manager 321 may control, allocate, or collect the system resources. According to an embodiment of the present disclosure, the system resource manager 321 may include a process manager, a memory manager, or a file system manager. The device driver 323 may include, for example, a display driver, a camera driver, a BT driver, a shared-memory driver, a USB driver, a keypad driver, a Wi-Fi driver, an audio driver, or an inter-process communication (IPC) driver.

The middleware 330 may provide a function required by the applications 370 in common or provide various functions to the applications 370 through the API 360 so that the applications 370 may efficiently use limited system resources of the electronic device. According to an embodiment of the present disclosure, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The run time library 335 may include, for example, a library module that a compiler uses in order to add new functions through a programming language while the applications 370 are executed. The run time library 335 may perform input/output management, memory management, or a function for an arithmetic function.

The application manager 341 may manage, for example, a life cycle of at least one application among the applications 370. The window manager 342 may manage a GUI resource used in the screen. The multimedia manager 343 may detect a format required for reproducing various media files and encode or decode a media file using a codec appropriate for the corresponding format. The resource manager 344 may manage resources, such as a source code, a memory, a storage space, and the like, of at least one application among the applications 370.

The power manager 345 may operate together with a basic input/output system (BIOS) to manage a battery or power and may provide power information required for the operation of the electronic device. The database manager 346 may generate, search for, or change a database to be used by at least one of the applications 370. The package manager 347 may manage the installation or the updating of applications distributed in the form of package file.

For example, the connectivity manager 348 may manage wireless connections, such as Wi-Fi or BT. The notification manager 349 may display or notify an event, such as a received message, an appointment, a proximity notification, and the like, to a user without disturbance. The location manager 350 may manage location information of the electronic device. The graphic manager 351 may manage graphic effects to be provided to a user and user interfaces related to the graphic effects. The security manager 352 may provide various security functions required for system security or user authentication. According to an embodiment of the present disclosure, when the electronic device (for example, the electronic device 101) has a call function, the middleware 330 may further include a telephony manager for managing a voice call function or a video call function of the electronic device.

The middleware 330 may a middleware module for forming a combination of various functions of the aforementioned elements. The middleware 330 may provide a modules specialized for each type of OS in order to provide a differentiated function. In addition, a few existing components may be dynamically removed from the middleware 330, or new components may be added to the middleware 3730.

The API 360 (for example, the API 145), which is a set of API programming functions, may include different configurations according to OSs. For example, in the case of Android or iOS, one API set may be provided for each platform. In the case of Tizen, two or more API sets may be provided for each platform.

The applications 370 (for example, the application program 147) may include, for example, one or more applications which can provide functions, such as a home 371, a dialer 372, a short message service (SMS)/multimedia messaging service (MMS) 373, an instant message (IM) 374, a browser 375, a camera 376, an alarm 377, contacts 378, a voice dialer 379, an email 380, a calendar 381, a media player 382, an album 383, a clock 384, health care (for example, measure exercise quantity or blood sugar), or environment information (for example, atmospheric pressure, humidity, or temperature information).

According to an embodiment of the present disclosure, the applications 370 may include an application (hereinafter, referred to as an "information exchange application" for convenience of the description) supporting information exchange between the electronic device (for example, the electronic device 101) and external electronic devices (for example, the first external electronic device 102 and the second external electronic device 104). The information exchange application may include, for example, a notification relay application for transmitting certain information to the external electronic device, or a device management application for managing the external electronic device.

For example, the notification relay application may include a function of transferring, to the external electronic device (for example, the first external electronic device 102 or the second external electronic device 104), notification information generated from other applications of the electronic device 101 (for example, an SMS/MMS application, an e-mail application, a health management application, or an environmental information application). Further, the notification relay application may receive notification information from, for example, an external electronic device and provide the received notification information to a user. For example, the device management application may manage (for example, install, delete, or update) at least one function of an external electronic device (for example, the second external electronic device 104) communicating with the electronic device (for example, a function of turning on/off the external electronic device itself (or some components) or a function of adjusting luminance (or a resolution) of the display), applications operating in the external electronic device, or services provided by the external electronic device (for example, a call service and a message service).

According to an embodiment of the present disclosure, the applications 370 may include an application (for example, a health management application) designated according to attributes (for example, attributes of the electronic device, such as the type of electronic device which corresponds to a mobile medical device) of the external electronic device (for example, the first external electronic device 102 or the second external electronic device 104). According to an embodiment of the present disclosure, the applications 370 may include an application received from the external electronic device (for example, the server 106, or the first external electronic device 102 or the second external electronic device 104). According to an embodiment of the present disclosure, the applications 370 may include a preloaded application or a third party application which can be downloaded from the server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least some of the programming module 310 may be implemented (for example, executed) by, for example, the processor (for example, the AP 210). At least some of the programming module 310 may include, for example, a module, a program, a routine, sets of instructions, a process, and the like, for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module," according to the an embodiment of present disclosure, may include at least one of an application-specific integrated circuit (ASIC) chip, a field-programmable gate arrays (FPGA), and a programmable-logic device for performing operations which has been known or are to be developed hereinafter.

According to various embodiments of the present disclosure, at least some of the devices (for example, modules or functions thereof) or the method (for example, operations), according to an embodiment of the present disclosure, may be implemented by a command stored in a computer-readable storage medium in a programming module form. When the command is executed by one or more processors (for example, the processor 120), the one or more processors may execute a function corresponding to the command. The computer-readable storage medium may be, for example, the memory 130.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The programming module, according to an embodiment of the present disclosure, may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be performed in a different order or omitted, or other operations may be added.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

Figure 4:
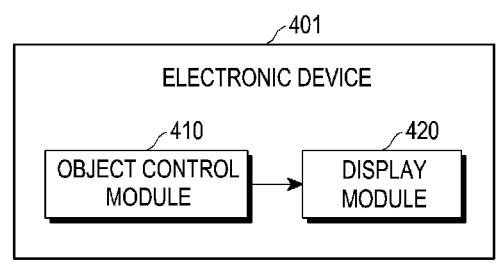
FIG. 4 is a block diagram of an electronic device for controlling an object of an application according to various embodiments of the present disclosure.

FIG. 4 is a block diagram of an electronic device for controlling an object of an application according to various embodiments of the present disclosure.

Referring to FIG. 4, an electronic device 401 may be, for example, the electronic device 101 illustrated in FIG. 1, and may include an object control module 410 and a display module 420.

According to various embodiments of the present disclosure, the object control module 410 may be the processor 120 illustrated in FIG. 1. The object control module 410 may include, for example, a combination of one, two or more of hardware, software, and firmware.

According to various embodiments of the present disclosure, the object control module 410 may control to configure and display an object for controlling an application based on the characteristic of the application.

According to an embodiment of the present disclosure, when an application is selected to be executed, the object control module 410 may identify the characteristic of the application. The object control module 410 may control to create property information (hereinafter, referred to as "object property information") for creating an object based on the characteristic of the application and to configure and display an object, by using the created object property information, which may control the application while the application is executed. The characteristic of the application may include, for example, at least one of the type of the application, user information including at least one of a usage pattern or user authentication information, an input function provided by the application, important content provided by the application, and the like.

According to an embodiment of the present disclosure, the object control module 410 may create the object property information for controlling an executed application based on the executed application type.

According to an embodiment of the present disclosure, the object control module 410 may create the object property information based on a user's usage pattern, and the user's usage pattern may be created based on the user's learned input pattern.

According to an embodiment of the present disclosure, in cases where a multi-user function is executable in the electronic device 401, the object control module 410 may create the object property information based on the authentication information of a user currently authenticated in the electronic device 401 among multiple users.

According to an embodiment of the present disclosure, the object control module 410 may create the object property information such that the object property information does not overlap an input function basically provided by a running application.

According to an embodiment of the present disclosure, the object control module 410 may create the object property information such that the object property information does not hide important content provided by a running application. The important content may be content frequently selected by a user, or may be a moving image or a still image. The important content may be set to be different according to the types of applications, and may also be selected by a user.

According to an embodiment of the present disclosure, the object control module 410 may create the object property information differently based on the type of content displayed in a running application.

According to an embodiment of the present disclosure, the object property information may include at least one of the shape of an object, the number of items contained in the object, types of items contained in the object, and the location of the object. According to an embodiment of the present disclosure, the types of items contained in the object may include at least one of a function capable of controlling a running application and system setting (for example, volume, execution of a multi-window, brightness, and the like).

According to an embodiment of the present disclosure, the object property information may be set in advance based on a characteristic of an application, may be stored in advance in a storage module of the electronic device 401, and may be edited by a user. The storage module of the electronic device 401 may be the memory 130 of FIG. 1.

According to various embodiments of the present disclosure, the object control module 410 may control to create the object property information based on the state of a running application and to dynamically configure and display an object by using the created object property information.

According to an embodiment of the present disclosure, when a screen change occurs while an application is executed, the object control module 410 may control to create or update new object property information based on the changed screen and to dynamically create and display an object based on the created or updated object property information. For example, in cases where switching to a telephone number input screen is made by a selection of a telephone number input function while a telephone call application is executed, the object control module 410 may control to configure and display a new object using object property information created based on the telephone number input function. In cases where the telephone number input screen is switched to a sending screen by the selection of a sending function after a telephone number is completely entered, the object control module 410 may control to configure and display a new object using object property information created or updated based on the sending function. In cases where the sending screen is switched to a telephone call connection screen by a telephone call function established based on the sending function, the object control module 410 may control to configure and display a new object using object property information created or updated based on the telephone call function. In cases where the telephone call connection screen is switched to a telephone call ending screen by the selection of a telephone call ending function while a telephone call is made to a counterpart by the establishment of the telephone call function, the object control module 410 may control to configure and display a new object using object property information created or updated based on the telephone call ending function.

According to an embodiment of the present disclosure, in cases where a screen change occurs according to a selection of a function while an application is executed, the object control module 410 may create or update object property information using at least some of all the items that may be detected based on the screen change. The object property information created or updated based on the screen change may include an item selected by a user in advance or an item detected based on the frequency of use.

According to various embodiments of the present disclosure, an event may occur while the object control module 410 displays an object configured based on the characteristic or state of a running application in the electronic device 401. The object control module 410 may control to create object property information based on the occurred event and to configure and display an object by using the created object property information. The event may include a communication event, such as a message or call occurring in the electronic device 401, an alarm event, an external device connection event, or an event for establishing communication with an external device.

According to an embodiment of the present disclosure, when a message is received while an application is executed, the object control module 410 may control to create object property information based on the received message and to configure and display an object for controlling the received message, instead of an object for the running application, by using the object property information.

According to an embodiment of the present disclosure, when a message is received while an application is executed, the object control module 410 may control to configure and display an object for controlling the received message at a location where the object does not overlap an object for the running application by using object property information created based on the received message.

According to an embodiment of the present disclosure, when a message is received while an application is executed, the object control module 410 may control to display a function for controlling the received message on at least a portion of an object for the running application by using object property information created based on the received message.

According to an embodiment of the present disclosure, when an external device (for example, earphones) is inserted while an application is executed, the object control module 410 may control to create the object property information based on the inserted external device and to configure and display an object for controlling the external device, instead of an object for the running application, by using the object property information.

According to an embodiment of the present disclosure, when an external device (for example, earphones) is inserted while an application is executed, the object control module

410 may control to configure and display an object for controlling the external device at a location where the object does not overlap an object for the running application by using object property information created based on the inserted external device.

According to an embodiment of the present disclosure, when an external device (for example, earphones) is inserted while an application is executed, the object control module 410 may control to display a function for controlling the external device on at least a portion of an object for the running application by using object property information created based on the inserted external device.

According to various embodiments of the present disclosure, while displaying execution screens of a plurality of applications in a plurality of windows, respectively, the object control module 410 may control to create object property information based on the characteristic of an activated application among the plurality of applications and to configure and display an object for controlling the activated application by using the created object property information.

According to an embodiment of the present disclosure, the object control module 410 may determine the activated application based on a user's selection of an application from the plurality of applications or an operation of an application (for example, playback of content, such as a video, in a video player).

According to an embodiment of the present disclosure, the electronic device 401 may display an Internet application in a first window among a plurality of windows and a planner application in a second window. When the first window is selected and activated, the object control module 410 may control to configure an object using object property information created based on the characteristic of the Internet application and to display the object on at least a part (for example, the first window) of a screen. Further, when the second window is selected and activated, the object control module 410 may control to configure an object using object property information created based on the characteristic of the planner application and to display the object on at least a part (for example, the second window) of the screen.

According to an embodiment of the present disclosure, the electronic device 401 may display an execution screen of an Internet application in a first window among a plurality of windows and an execution screen of a planner application in a second window. For example, the object control module 410 may control to configure an object using object property information created based on the characteristic of the Internet application and to display the object in the first window, and may control to configure an object using object property information created based on the characteristic of the planner application and to display the object in the second window.

In another example, the electronic device 401 may display an execution screen of an Internet application in first and second windows among a plurality of windows. The object control module 410 may configure an object using object property information created based on the characteristic of the Internet application and display the object in the first or second window that is set as a default. Further, the object control module 410 may configure an object using the object property information created based on the characteristic of the Internet application and display the object in the first or second window that is activated by a user's selection.

According to various embodiments of the present disclosure, the electronic device 401 may display an execution screen of an identical application in a plurality of windows. The object control module 410 may control to create object property information based on the characteristic of the identical application and to configure and display an object for controlling the identical application by using the created object property information. While the object is displayed, when an input (for example, a gesture) for selecting a window is generated within a certain period of time after a specific item is selected from one or more items contained in the object, the object control module 410 may perform a function corresponding to the specific item in an application that is being executed in the window corresponding to the input.

According to an embodiment of the present disclosure, the electronic device 401 may display an execution screen of an Internet application in first and second windows among a plurality of windows. The object control module 410 may control to configure an object using object property information created based on the characteristic of the Internet application and to display the object in the first or second window that is set as a default. Further, the object control module 410 may control to configure an object using the object property information created based on the characteristic of the Internet application and to display the object in the first or second window that is activated based on an input of a user or an OS.

According to an embodiment of the present disclosure, the electronic device 401 may display an object for controlling the Internet application in the first window on an upper side of the screen thereof among the plurality of windows, or in the second window on a lower side of the screen thereof. When an input for selecting a window, for example, an upward drag is generated within a certain period of time after a selection of a first item for a previous screen function among, for example, five items contained in the object, the object control module 410 may perform the previous screen function on the Internet application of which the execution screen is being displayed in the first window.

According to an embodiment of the present disclosure, the electronic device 401 may display an object for controlling the Internet application in the first window on the upper side of the screen thereof among the plurality of windows, or in the second window on the lower side of the screen thereof. When an input for selecting a window, for example, a downward drag is generated within a certain period of time after a selection of a second item for a previous screen function among, for example, five items contained in the object, the object control module 410 may perform the previous screen function on the Internet application of which the execution screen is being displayed in the second window.

According to various embodiments of the present disclosure, while displaying execution screens of a plurality of applications in a plurality of windows, respectively, the object control module 410 may control to create a plurality of pieces of object property information based on the characteristics of the plurality of applications and to configure and display a single object using the plurality of pieces of object property information.

According to an embodiment of the present disclosure, in cases where a plurality of applications are executed in a plurality of windows, respectively, the object control module 410 may control to configure and display a single object for controlling the applications based on object property information of the plurality of applications. The object control module 410 may control to distinguishably dispose and display a plurality of items contained in the single object based on the object property information of the plurality of applications. The object control module 410 may distinguishably dispose the plurality of items contained in the single object based on at least one of shapes, sizes, colors, or locations thereof according to the plurality of pieces of object property information.

According to an embodiment of the present disclosure, the electronic device 401 may display an execution screen of an Internet application in a first window on an upper side of the screen thereof among a plurality of windows and an execution screen of a planner application in a second window on a lower side of the screen thereof. The object control module 410 may create first object property information based on the characteristic of the Internet application and second object property information based on the characteristic of the planner application. The object control module 410 may configure a single object using the first object property information and the second object property information. For example, the object control module 410 may control to display the object in the border area between the first and second windows. In another example, when displaying the object in the shape of a fan with two lines, the object control module 410 may control to display first to third items created based on the first object property information in the upper line and fourth to sixth items created based on the second object property information in the lower line. In yet another example, when a first application running in the first window among the plurality of windows is selected and activated, the object control module 410 may control to display the deactivation of a second application running in the second window by performing color processing on the third and fourth items among the plurality of items of the object (for example, display the third and fourth items in gray).

According to various embodiments of the present disclosure, the object control module 410 may receive one or more hold detection signals while the electronic device 401 executes an application and displays an object for controlling the executed application. Based on the reception of the one or more hold detection signals, the object control module 410 may control to classify the object to correspond to at least one of the number of hold detection signals and the locations where the hold detection signals have been generated and to display the classified object on screen areas of the display module 420 that correspond to the locations where the one or more hold detection signals have been generated in the electronic device 401.

According to an embodiment of the present disclosure, the electronic device 401 may be held by both of a user's hands while the electronic device 401 executes an Internet application and the object control module 410 displays a fan type of object containing first to sixth items for controlling the Internet application. The object control module 410 may classify the object into first and second objects when left and right hold detection signals are received. The object control module 410 may control to display a fan type of first object containing the first to third items on the lower left side of the screen of the display module 420 and a fan type of second object containing the fourth to sixth items on the lower right side of the screen of the display module 420.

According to an embodiment of the present disclosure, while the first and second objects for controlling the Internet application are displayed, when an input for movement (for example, a rightward drag) is generated within a certain period of time after a user selects the first object displayed on the left side of the screen of the display module 420, the object control module 410 may control to display an object into which the first and second objects are integrated on the right side of the screen of the display module 420. While the first and second objects for controlling the Internet application are displayed, when an input for movement (for example, a leftward drag) is generated within a certain period of time after the user selects the second object displayed on the right side of the screen of the display module 420, the object control module 410 may control to display the object into which the first and second objects are integrated on the left side of the screen of the display module 420.

According to various embodiments of the present disclosure, when an application is executed, the object control module 410 may identify location information specified according to the type of application in the storage module and may control to display an object for controlling the application based on the identified location information. The display module 420 may be, for example, the display 160 illustrated in FIG. 1. According to an embodiment of the present disclosure, while an application is executed, the display module 420 may display an object dynamically configured based on the characteristic or state of the application.

According to various embodiments of the present disclosure, the display module 420 may be functionally connected to the electronic device, and the object control module 410 may create object property information based on a characteristic of an application when the application is executed, and may configure and display an object for controlling at least some functions of the application based on the object property information.

According to various embodiments of the present disclosure, the object property information may include at least one of the shape of an object, the number of items contained in the object, functions of the items contained in the object, and the location of the object.

According to various embodiments of the present disclosure, when a screen change occurs while the application is executed, the object control module 410 may create object property information based on the changed screen, and may configure and display an object for controlling at least some functions of the application based on the object property information.

According to various embodiments of the present disclosure, when an event occurs while the application is executed, the object control module 410 may create object property information based on information of the event, and may configure and display an object for controlling the event based on the object property information.

According to various embodiments of the present disclosure, while execution screens of a plurality of applications are displayed in a plurality of windows, respectively, the object control module 410 may create object property information based on a characteristic of an application executed in an activated window among the plurality of windows, and may configure and display an object for controlling the application executed in the activated window based on the object property information.

According to various embodiments of the present disclosure, while displaying execution screens of a plurality of identical applications in a plurality of windows, respectively, the object control module 410 may create object property information based on characteristics of the plurality of applications, and may configure and display an object for controlling the plurality of applications based on the object property information.

According to various embodiments of the present disclosure, when an input for selecting a specific application is detected after a specific item is selected from one or more items contained in the object, the object control module 410 may perform a function corresponding to the specific item in the specific application.

According to various embodiments of the present disclosure, while displaying a plurality of applications in a plurality of windows, respectively, the object control module 410 may create a plurality of pieces of object property information based on characteristics of the plurality of applications, and may configure and display an object for controlling the plurality of applications based on the plurality of pieces of object property information.

According to various embodiments of the present disclosure, the object control module 410 may distinguishably arrange and display a plurality of items contained in the object for controlling the plurality of applications, based on at least one of shapes, sizes, colors, and locations thereof according to the plurality of pieces of object property information.

According to various embodiments of the present disclosure, while executing the application, the object control module 410 may identify one or more hold detection signals, and may distinguishably display the object in one or more partial areas of the display module that correspond to the one or more hold detection signals.

FIGS. 5A, 5B, 5C, 5D, 5E, and 5F illustrate types of object shapes of an application according to various embodiments of the present disclosure.

Figure 5C:
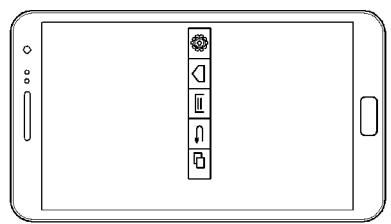
FIGS. 5A, 5B, 5C, 5D, 5E, and 5F illustrate types of object shapes of an application according to various embodiments of the present disclosure.
Figure 5F:
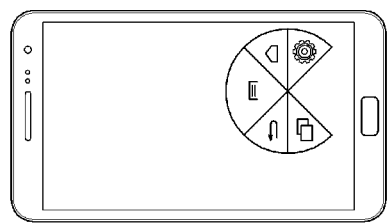
Figure 5B:
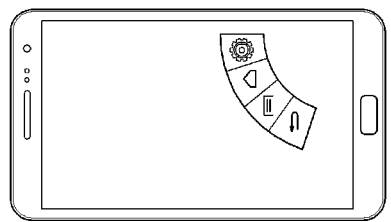
Figure 5E:
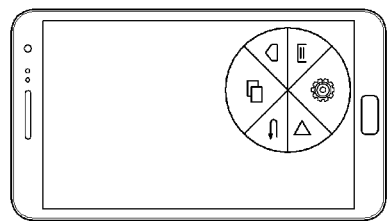
Figure 5A:
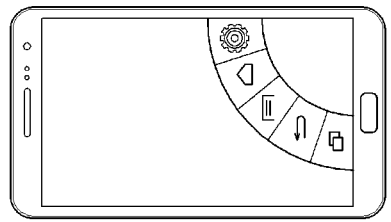
Figure 5D:
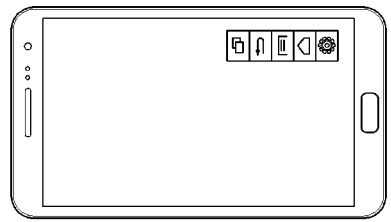

Referring to FIGS. 5A, 5B, 5C, 5D, 5E, and 5F, the object shape may include a fan type illustrated in FIG. 5A, a modified fan type illustrated in FIG. 5B, a horizontal bar type illustrated in FIG. 5C, a vertical bar type illustrated in FIG. 5D, a circular type illustrated in FIG. 5E, or a modified circular type illustrated in FIG. 5F.

FIGS. 6A, 6B, 6C, 6D, 6E, and 6F illustrate an object display of an application according to various embodiments of the present disclosure.

Figure 6C:
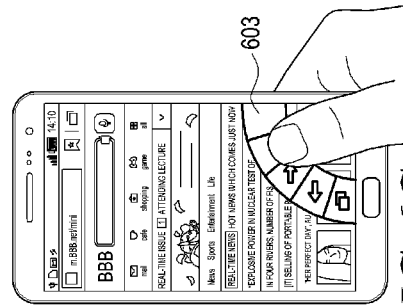
FIGS. 6A, 6B, 6C, 6D, 6E, and 6F illustrate an object display of an application according to various embodiments of the present disclosure.
Figure 6F:
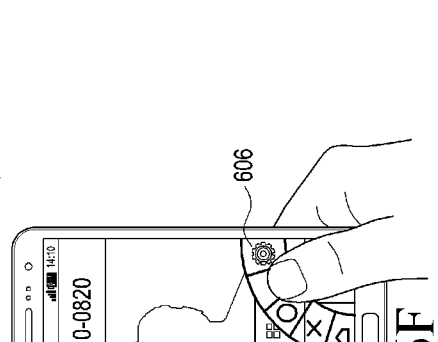
Figure 6B:
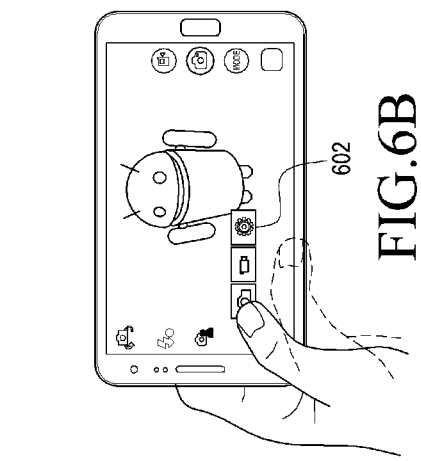
Figure 6E:
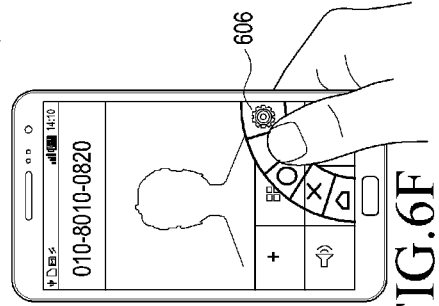
Figure 6A:
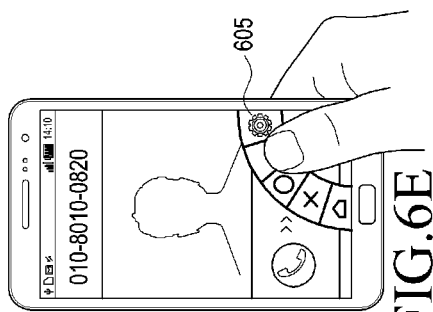

FIGS. 6A, 6B, and 6C illustrate an object display according to the type of an application according to various embodiments.

Referring to FIG. 6A, in the case of a music application, a circular type of object that contains six items, for example, a controller 601 may be displayed on the lower right side of a screen.

Referring to FIG. 6B, in the case of a camera application, a bar type of object that contains three items, for example, a controller 602 may be displayed on the lower left side of a screen.

Referring to FIG. 6C, in the case of an Internet application, a fan type of object that contains five items, for example, a controller 603 may be displayed on the lower right side of a screen.

Figure 6D:
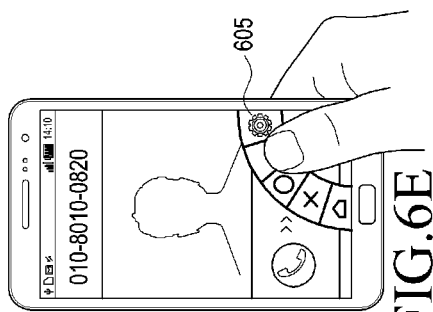

FIGS. 6D, 6E, and 6F illustrate an object display according to the status of an application according to various embodiments.

Referring to FIG. 6D, in cases where a screen is switched to a telephone number input screen by the selection of a telephone number input function while a telephone call application is being executed, a fan type of object that contains one or more items, for example, a controller 604 may be displayed.

Referring to FIG. 6E, in cases where the screen is switched to a sending screen by a selection of a sending function after a telephone number is completely entered, a fan type of object that differs from the object of the telephone number input screen and contains one or more items, for example, a controller 605 may be displayed.

Referring to FIG. 6F, in cases where the screen is switched to a telephone call connection screen by a telephone call function established based on the sending function, a fan type of object that differs from the object of the sending screen and contains one or more items, for example, a controller 606 may be displayed.

Figure 7A:
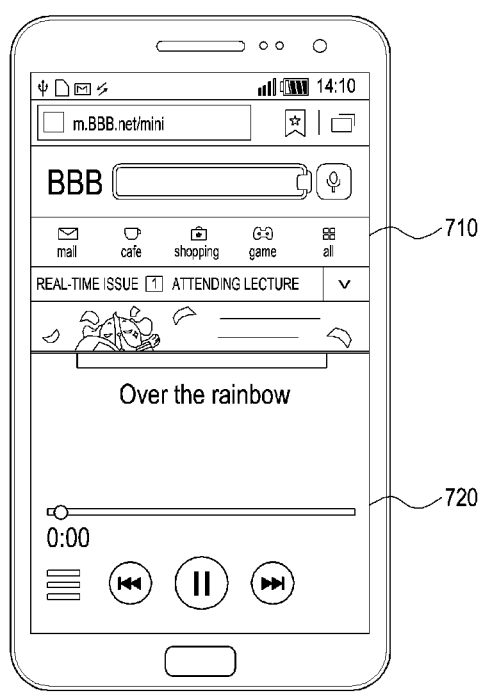
FIGS. 7A, 7B, and 7C illustrate an object control operation based on a characteristic of an activated application among a plurality of applications according to various embodiments of the present disclosure.
Figure 7B:
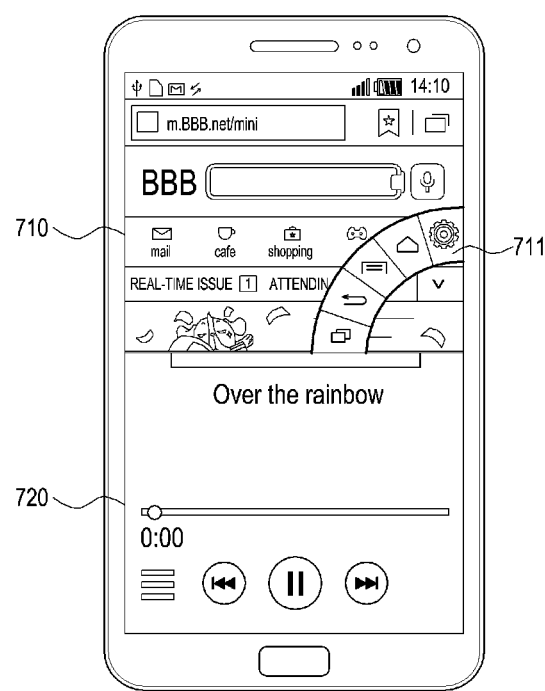
Figure 7C:
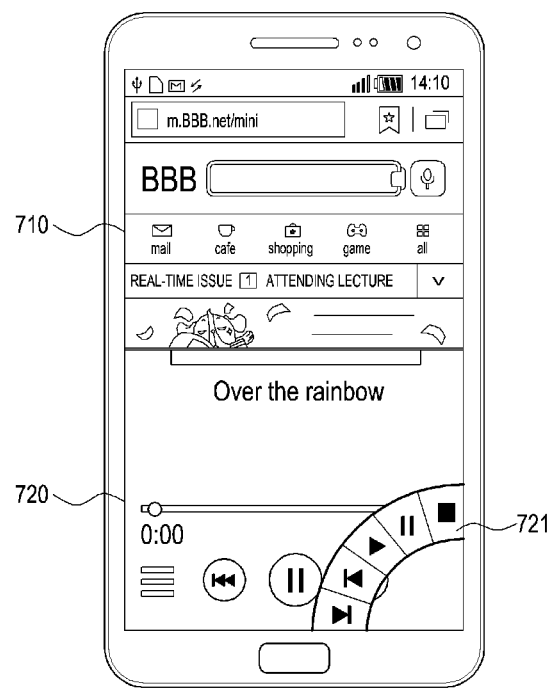

FIGS. 7A, 7B, and 7C illustrate an object control operation based on a characteristic of an activated application among a plurality of applications according to various embodiments of the present disclosure.

Referring to FIGS. 7A, 7B, and 7C, while an execution screen of an Internet application is displayed in a first window 710 among a plurality of windows and an execution screen of a music application is displayed in a second window 720 as illustrated in FIG. 7A, if the first window 710 is activated by a user selection, an object that may create first object property information based on the characteristic of the Internet application and control the Internet application based on the first object property information, for example, a fan type of controller 711 may be displayed in the first window 710 as illustrated in FIG. 7B. While the execution screen of the Internet application is displayed in the first window 710 among the plurality of windows and the execution screen of the music application is displayed in the second window 720 as illustrated in FIG. 7A, if the second window 720 is activated by a user selection or playback of music, an object that may create second object property information based on the characteristic of the music application and control the music application based on the second object property information, for example, a fan type of controller 721 may be displayed in the second window 720 as illustrated in FIG. 7C.

Figure 8A:
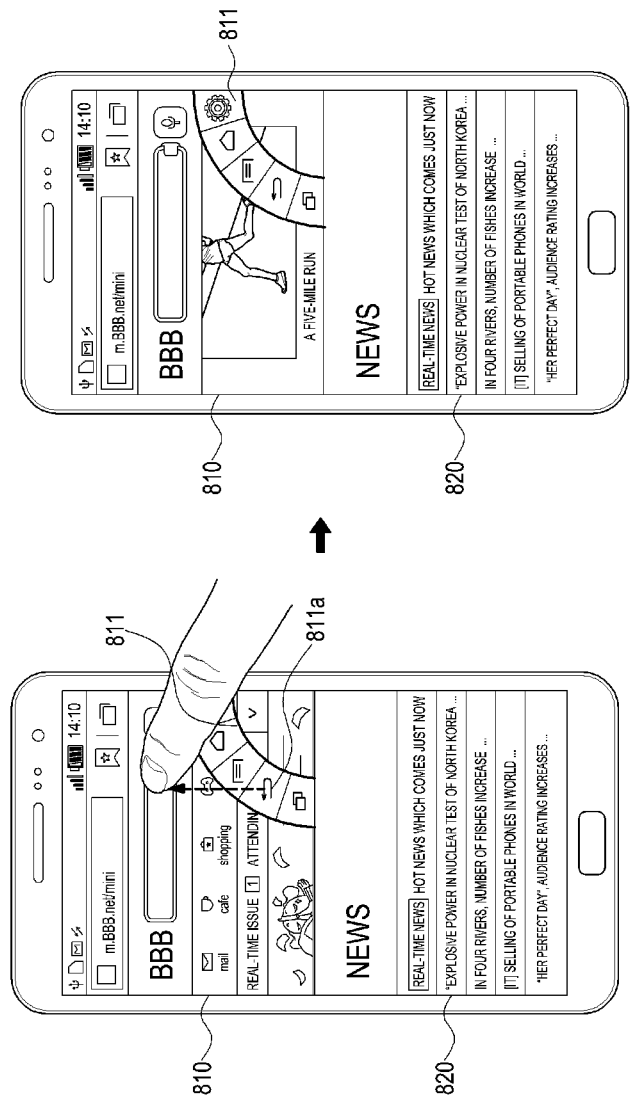
FIGS. 8A and 8B illustrate an object control operation based on characteristics of a plurality of identical applications according to various embodiments of the present disclosure.
Figure 8B:
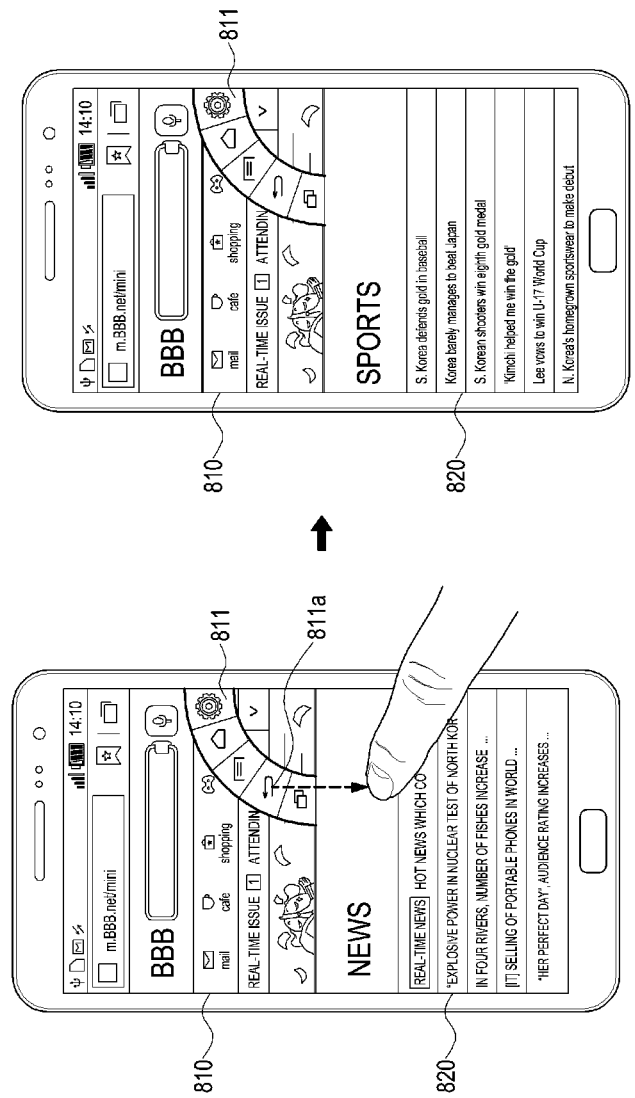

FIGS. 8A and 8B illustrate an object control operation based on characteristics of a plurality of identical applications according to various embodiments of the present disclosure.

Referring to FIG. 8A, according to an embodiment of the present disclosure, execution screens of Internet applications may be displayed in first and second windows 810 and 820, and an object that may control the Internet applications, for example, a fan type of controller 811 may be displayed in the first window 810. When an item 811a for performing a function of returning to a previous screen among the items contained in the controller 811 is selected and a drag is generated in an upward direction, an operation may be performed to switch the execution screen of the Internet application displayed in the first window 810 to the previous screen.

Referring to FIG. 8B, according to an embodiment of the present disclosure, execution screens of Internet applications may be displayed in first and second windows 810 and 820, and an object that may control the Internet applications, for example, a fan type of controller 811 may be displayed in the first window 810. When an item 811a for performing a function of returning to a previous screen among the items contained in the controller 811 is selected and a drag is generated in a downward direction, an operation may be performed to switch the execution screen of the Internet application displayed in the second window 820 to the previous screen.

Figure 9:
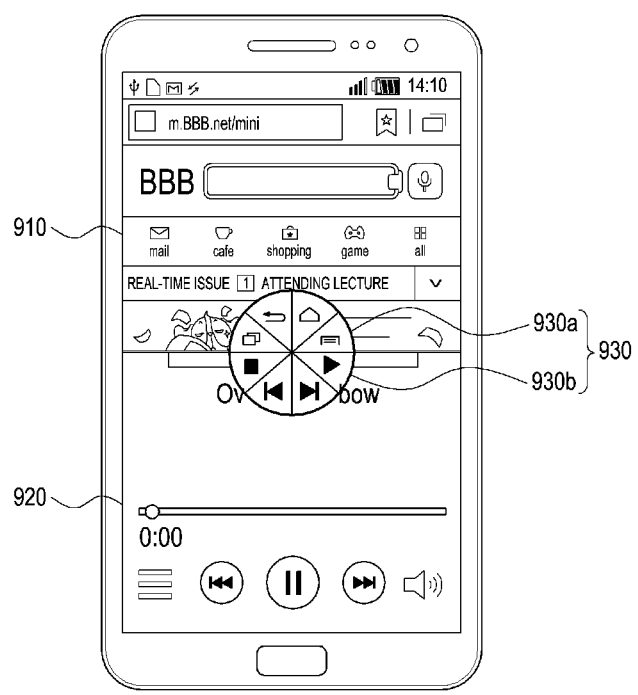
FIG. 9 illustrates an object control operation based on characteristics of a plurality of applications according to various embodiments of the present disclosure.

FIG. 9 illustrates an object control operation based on characteristics of a plurality of applications according to various embodiments of the present disclosure.

Referring to FIG. 9, an execution screen of an Internet application may be displayed in a first window 910, and an execution screen of a music application may be displayed in a second window 920 among a plurality of windows. A single circular controller 930 that includes an object 930*a* for controlling the Internet application and an object 930*b* for controlling the music application may be displayed on the border between the first and second windows 910 and 920.

Figure 10A:
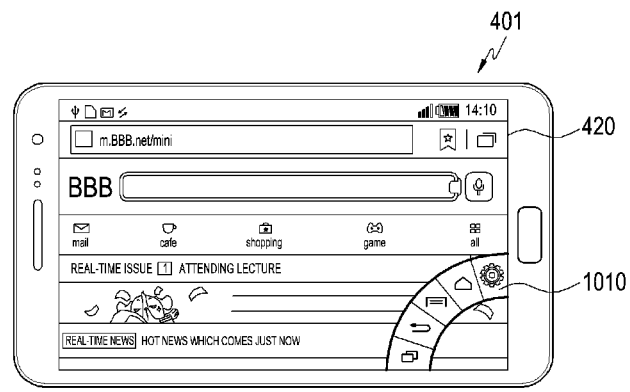
FIGS. 10A and 10B illustrate an object control operation based on an operation of detecting a hold on an electronic device according to various embodiments of the present disclosure.
Figure 10B:
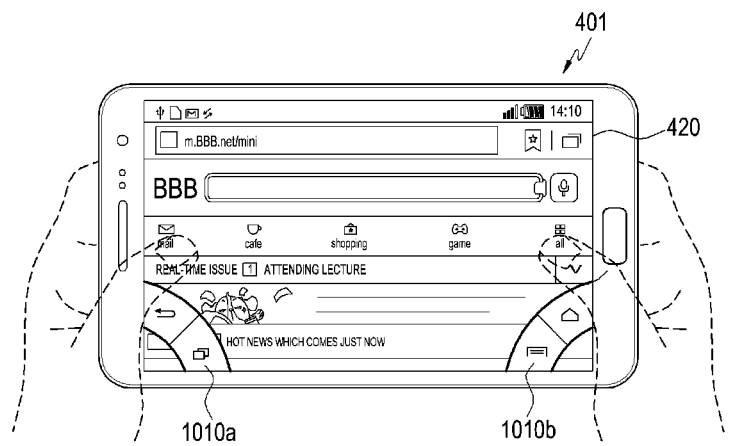

FIGS. 10A and 10B illustrate an object control operation based on an operation of detecting a hold on an electronic device according to various embodiments of the present disclosure.

Referring to FIGS. 10A and 10B, while an execution screen of an Internet application is displayed on a screen of a display module 420, an object for controlling the Internet application, for example, a fan type of a controller 1010 may be displayed on the lower right side of the screen. When a user holds an electronic device 401 with his/her both hands in the state illustrated in FIG. 10A, the controller 1010 may be divided into a first controller 1010*a* and a second controller 1010*b*. The first controller 1010*a* that contains some of the items of the controller 1010 may be displayed on the lower left side of the screen of the display module 420, and the second controller 1010*b* that contains the rest of the items of the controller 1010 may be displayed on the lower right side of the screen of the display module 420.

Figure 11:
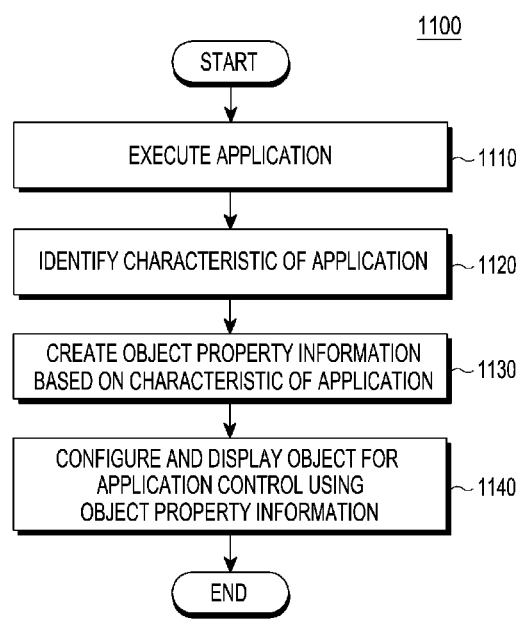
FIG. 11 is a flowchart illustrating an object control method based on a characteristic of an application according to various embodiments of the present disclosure.

FIG. 11 is a flowchart illustrating an object control method based on a characteristic of an application according to various embodiments of the present disclosure.

Referring to FIG. 11, it will be exemplified that an object control method 1100, according to the various embodiments of the present disclosure, is performed by the object control module 410 of the electronic device 401 illustrated in FIG. 4.

Referring to FIG. 11, the object control method 1100, according to the various embodiments of the present disclosure, includes operations 1110, 1120, 1130, and 1140.

In operation 1110, the object control module 410 may execute an application.

In operation 1120, the object control module 410 may identify the characteristic of the executed application. The characteristic of the application may include, for example, at least one of the type of application, user information, an input function provided by the application, important content provided by the application, and the like.

In operation 1130, the object control module 410 may create object property information based on the identified characteristic of the application. In operation 1130, the object control module 410 may create the object property information that includes at least one of the shape of an object, the number of items contained in the object, the types of items contained in the object, and the location of the object.

In operation 1140, the object control module 410, while executing the application, may control to display an object configured to control the application by using the object property information. In operation 1140, the object control module 410 may detect a user input (for example, a specific gesture, or a menu selection) for controlling the object, or may deactivate the display of the object in cases where the object is not used for more than a certain period of time. The object control module 410, while executing the application, may control to display the object by detecting the user input (for example, a specific gesture or a menu selection) for controlling the object.

Figure 12:
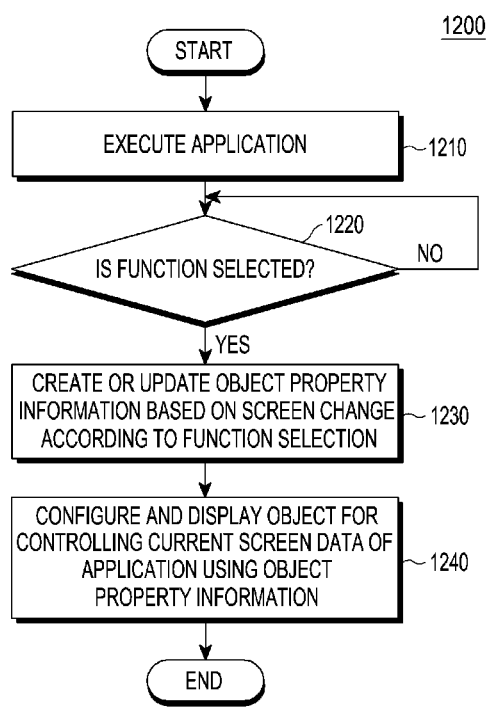
FIG. 12 is a flowchart illustrating an object control method based on a screen change of an application according to various embodiments of the present disclosure.

FIG. 12 is a flowchart illustrating an object control method based on a screen change of an application according to various embodiments of the present disclosure.

Referring to FIG. 12, it will be exemplified that an object control method 1200, according to the various embodiments of the present disclosure, is performed by the object control module 410 of the electronic device 401 illustrated in FIG. 4.

Referring to FIG. 12, the object control method 1200, according to the various embodiments of the present disclosure, includes operations 1210, 1220, 1230, and 1240. In operation 1210, the electronic device 401 may execute a selected application.

In operation 1210, the object control module 410, while executing the application, may control to display an object that is configured using object property information created based on the characteristic of the executed application.

In operation 1220, the object control module 410 may determine whether a screen change has occurred based on the selection of a function associated with the executed application.

In operation 1230, the object control module 410 may create or update object property information based on a screen changed according to the function selection.

In operation 1240, the object control module 410 may control to configure and display an object that may control current screen data, by using the created or updated object property information.

Figure 13:
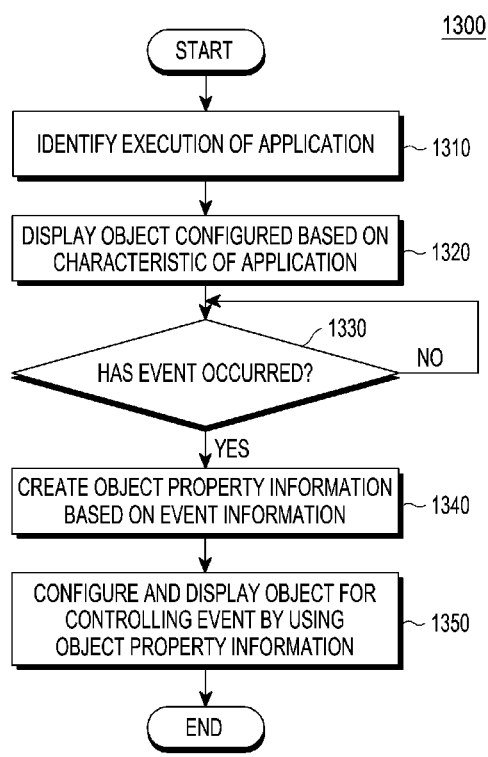
FIG. 13 is a flowchart illustrating an object control method based on an occurrence of an event according to various embodiments of the present disclosure.

FIG. 13 is a flowchart illustrating an object control method based on an occurrence of an event according to various embodiments of the present disclosure.

Referring to FIG. 13, it will be exemplified that an object control method 1300, according to the various embodiments of the present disclosure, is performed by the object control module 410 of the electronic device 401 illustrated in FIG. 4.

Referring to FIG. 13, the object control method 1300, according to the various embodiments of the present disclosure, includes operations 1310, 1320, 1330, 1340, and 1350.

In operation 1310, the object control module 410 may identify whether an application is executed.

In operation 1320, the object control module 410, while displaying an execution screen of the application, may control to display an object that is configured using object property information created based on the characteristic of the executed application.

While the application is executed, the object control module may determine the occurrence of an event in operation 1330. When it is determined in operation 1330 that the event has occurred, the object control module 410 may create or update object property information based on information of the event in operation 1340. The event may include at least one of a communication event, such as a message or call occurring in the electronic device 401, an alarm event, an external device connection event, or an event for establishing communication with an external device.

In operation 1350, the object control module 410 may configure an object for controlling the occurred event by using the object property information created based on the information of the event. In operation 1350, the object control module 410, while displaying the object for controlling the application, may control to display the object for controlling the event automatically or according to a user input (for example, a specific gesture or a menu selection). Alternatively, the object control module 410, while not displaying the object for controlling the application, may control to display the object for controlling the event automatically or according to a user input (for example, a specific gesture or a menu selection).

Figure 14:
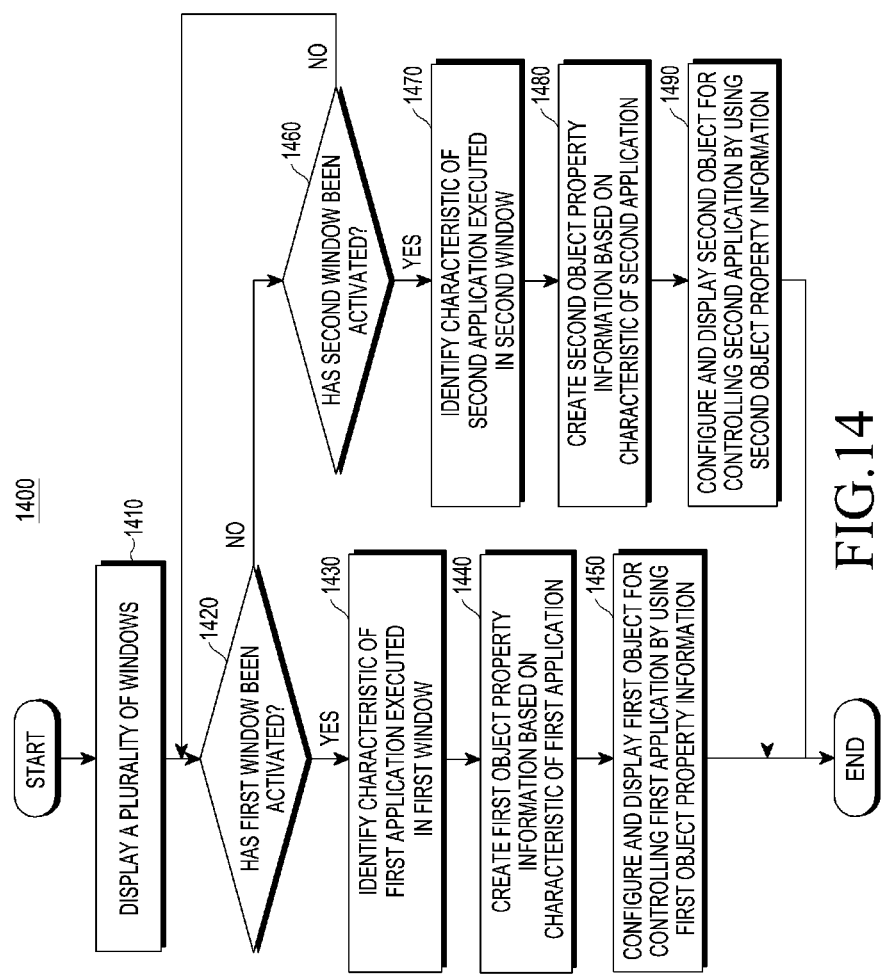
FIG. 14 is a flowchart illustrating an object control method based on a characteristic of an activated application among a plurality of applications according to various embodiments of the present disclosure.

FIG. 14 is a flowchart illustrating an object control method based on a characteristic of an activated application among a plurality of applications according to various embodiments of the present disclosure.

Referring to FIG. 14, it will be exemplified that an object control method 1400, according to the various embodiments of the present disclosure, is performed by the object control module 410 of the electronic device 401 illustrated in FIG. 4.

Referring to FIG. 14, the object control method 1400, according to the various embodiments of the present disclosure, includes operations 1410 to 1490.

In operation 1410, the display module 420 may display execution screens of first and second applications in a plurality of windows, for example, in first and second windows, respectively.

In operation 1420, the object control module 410 may determine whether the first window has been activated. The object control module 410 may determine the activation of the first window through a user selection of the first window, or through the playback of content, such as a video, via the first application in the first window. When the determination result in operation 1420 shows that the first window has been activated, the object control module 410 may identify the characteristic of the first application displayed in the first window in operation 1430.

In operation 1440, the object control module 410 may control to create first object property information based on the characteristic of the first application, and in operation 1450, the object control module 410 may control to configure and display a first object for controlling the first application by using the first object property information.

In operation 1460, the object control module 410 may determine whether the second window has been activated. The object control module 410 may determine the activation of the second window through a user selection of the second window, or through the playback of content, such as a video, via the second application in the second window. When the determination result in operation 1460 shows that the second window has been activated, the object control module 410 may identify the characteristic of the second application displayed in the second window in operation 1470.

In operation 1480, the object control module 410 may control to create second object property information based on the characteristic of the second application, and in operation 1490, the object control module 410 may control to configure and display a second object for controlling the second application by using the second object property information.

The object control module 410, according to the various embodiments of the present disclosure, may control to display the object created based on the characteristic of the activated application among the plurality of applications on at least a partial area of the display module 420. For example, when it is determined that the first window has been activated, the object control module 410 may control to display, in the first window area, the first object created using the first object property information created based on the characteristic of the first application. Alternatively, the object control module 410 may control to display the first object in an area (for example, the second window area) that does not overlap the application displayed in the first window area.

Figure 15:
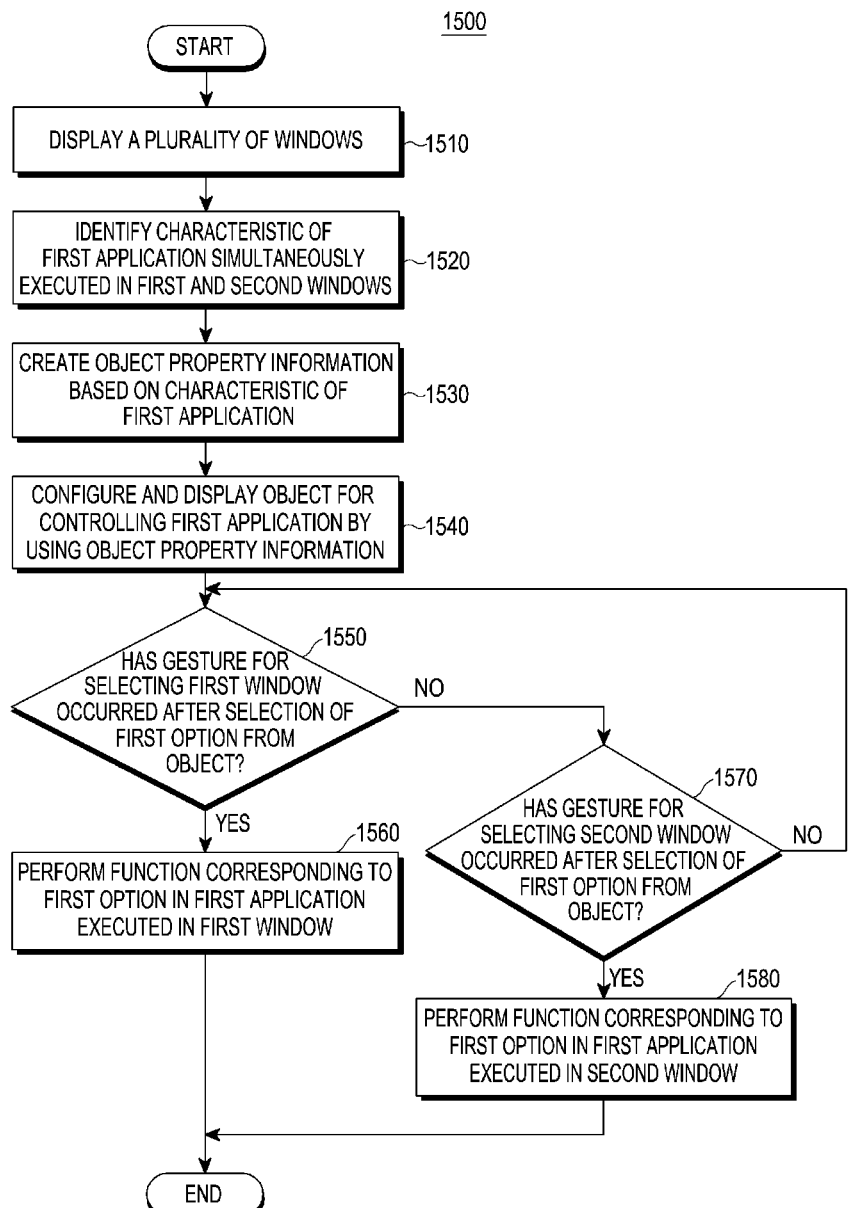
FIG. 15 is a flowchart illustrating an object control method based on a characteristic of an identical application executed in a plurality of windows according to various embodiments of the present disclosure.

FIG. 15 is a flowchart illustrating an object control method based on a characteristic of an identical application executed in a plurality of windows according to various embodiments of the present disclosure.

In FIG. 15, it will be exemplified that an object control method 1500, according to the various embodiments of the present disclosure, is performed by the object control module 410 of the electronic device 401 illustrated in FIG. 4.

Referring to FIG. 15, the object control method 1500, according to the various embodiments of the present disclosure, includes operations 1510 to 1580.

In operation 1510, the display module 420 may display an execution screen of a first application on a plurality of windows, for example, on first and second windows.

In operation 1520, the object control module 410 may identify the characteristic of the first application which is simultaneously executed and displayed in the first and second windows.

In operation 1530, the object control module 410 may control to create object property information based on the characteristic of the first application, and in operation 1540, the object control module 410 may control to configure an object for controlling the first application by using the object property information and display the configured object in the first or second window. In operation 1540, the object control module 410 may display the object in a window that is set as a default among the first and second windows, or in a window selected by a user.

In operation 1550, the object control module 410 may determine whether an input for selecting the first window (for example, a drag toward the first window) has occurred within a certain period of time after a selection of a first item from one or more items contained in the object. When it is determined in operation 1550 that the input for selecting the first window has occurred within the certain period of time after the selection of the first item, the object control module 410 may, in operation 1560, perform a function corresponding to the first item in the first application which is being executed in the first window.

In operation 1570, the object control module 410 may determine whether an input for selecting the second window (for example, a drag toward the second window) has occurred within a certain period of time after the selection of the first item from the one or more items contained in the object. When it is determined in operation 1570 that the input for selecting the second window has occurred within the certain period of time after the selection of the first item, the object control module 410 may, in operation 1580, perform a function corresponding to the first item in the second application which is being executed in the second window.

Figure 16:
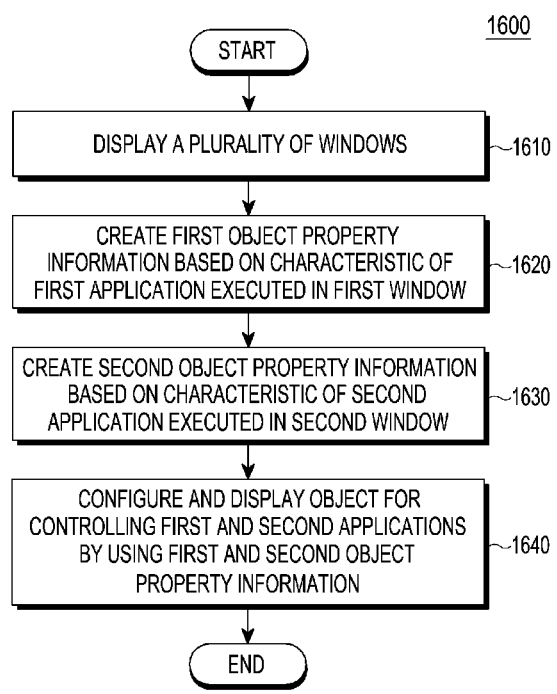
FIG. 16 is a flowchart illustrating an object control method based on characteristics of a plurality of applications according to various embodiments of the present disclosure.

FIG. 16 is a flowchart illustrating an object control method based on characteristics of a plurality of applications according to various embodiments of the present disclosure.

Referring to FIG. 16, it will be exemplified that an object control method 1600, according to the various embodiments of the present disclosure, is performed by the object control module 410 of the electronic device 401 illustrated in FIG. 4.

Referring to FIG. 16, the object control method 1600, according to the various embodiments of the present disclosure, includes operations 1610 to 1640.

In operation 1610, the display module 420 may display execution screens of first and second applications on a plurality of windows, for example, on first and second windows, respectively.

In operation 1620, the object control module 410 may create first object property information based on the characteristic of the first application.

In operation 1630, the object control module 410 may create second object property information based on the characteristic of the second application.

In operation 1640, the object control module 410 may configure and display an object for controlling the first application displayed in the first window and the second application displayed in the second window by using the first and second object property information.

In operation 1640, the object control module 410 may control to configure and display the object in which at least one item for controlling the first application displayed in the first window and at least one item for controlling the second application displayed in the second window are disposed so as to be distinguished from each other.

In operation 1640, the object control module 410 may display the object in one of the first and second windows based on the characteristics of the first and second applications which are being displayed in the first and second windows, respectively. For example, the object control module 410 may control to display the object in the second window in cases where the second application has a higher user input frequency than the first application. For example, the object control module 410 may control to display the object in the second window in cases where the execution screen of the first application based on content, such as a video, is displayed in the first window. For example, the object control module 410 may control to display the object in the first window in cases where content, such as a video, is played back in the first window.

Figure 17:
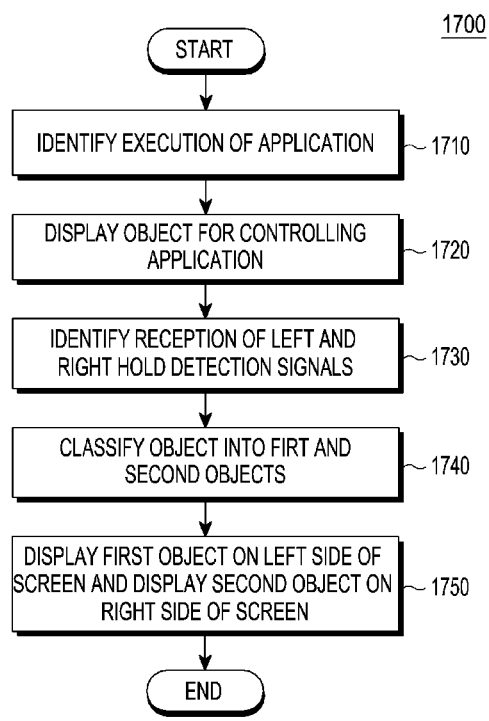
FIG. 17 is a flowchart illustrating an object control method based on an operation of detecting a hold on an electronic device according to various embodiments of the present disclosure.

FIG. 17 is a flowchart illustrating an object control method based on an operation of detecting a hold on an electronic device according to various embodiments of the present disclosure.

Referring to FIG. 17, it will be exemplified that an object control method 1700, according to the various embodiments of the present disclosure, is performed by the object control module 410 of the electronic device 401 illustrated in FIG. 4.

Referring to FIG. 17, the object control method 1700, according to the various embodiments of the present disclosure, includes operations 1710 to 1750.

In operation 1710, the object control module 410 may identify whether an application is executed.

In operation 1720, the object control module 410, while displaying an execution screen of the application, may control to display an object that is configured using object property information created based on the characteristic of the executed application.

In operation 1730, the object control module 410 may, for example, identify the reception of a left hold detection signal and a right hold detection signal when a user holds the electronic device 401 with his/her both hands.

In operation 1740, the object control module 410 may classify the object for controlling the application into a first object and a second object based on the left and right hold detection signals. In operation 1740, the object control module 410 may classify the object into the first object containing the first to third items among a plurality of items contained in the object, for example, among the first to sixth items, and the second object containing the fourth to sixth items.

In operation 1750, the object control module 410 may control to display the first object in a partial area (for example, a lower end portion, a holding area, or a user designated location) on the left side of the screen of the display module 420 and the second object in a partial area (for example, a lower end portion, a holding area, or a user designated location) on the right side of the screen of the display module 420.

In another example, the object control module 410, while displaying the object, may identify the reception of a left hold detection signal or a right hold detection signal when a user holds the electronic device 401 with his/her one hand. The object control module 410 may control to display the object in a partial area (for example, a lower end portion, a holding area, or a user designated location) on the left or right side of the screen of the display module based on the received left or right hold detection signal.

In yet another example, while the object control module 410 displays the integrated object in a partial area (for example, a lower end portion, a holding area, or a user designated location on the left or right side) of the screen of the display module 420 when a user holds the electronic device 401 with his/her one hand, if the user holds the electronic device 401 with his/her both hands, the object control module 410 may identify the reception of left and right hold detection signals. The object control module 410 may control to classify the object into first and second objects based on the received left and right hold detection signals and display the first object in a partial area on the left side of the screen of the display module 420 and the second object in a partial area on the right side of the screen of the display module 420.

In yet another example, when a user holds the electronic device 401 with his/her both hands, the object control module 410 may display the first object in a partial area (for example, a lower end portion, a holding area, or a user designated location) on the left side of the screen of the display module 420 and the second object in a partial area (for example, a lower end portion, a holding area, or a user designated location) on the right side of the screen of the display module 420. When the user holds the electronic device 401 with his/her one hand, the object control module 410 may identify the reception of a left or right hold detection signal. The object control module 410 may control to integrate the first and second objects into a single object based on the received left or right hold detection signal and to display the integrated object in a partial area (for example, a lower end portion, a holding area, or a user designated location on the left or right side) of the screen of the display module 420.

According to various embodiments of the present disclosure, a method of controlling an object in an electronic device may include creating object property information based on a characteristic of an application when the application is executed, and configuring and displaying an object for controlling at least some functions of the application based on the object property information.

According to various embodiments of the present disclosure, the object property information may include at least one of the shape of an object, the number of items contained in the object, functions of the items contained in the object, and the location of the object.

According to various embodiments of the present disclosure, the method may further include creating, when a screen change occurs while the application is executed, object property information based on the changed screen, and configuring and displaying an object for controlling at least some functions of the application based on the object property information.

According to various embodiments of the present disclosure, the method may further include creating, when an event occurs while the application is executed, object property information based on information of the event, and configuring and displaying an object for controlling the event based on the object property information.

According to various embodiments of the present disclosure, the method may further include creating, while execution screens of a plurality of applications are displayed in a plurality of windows, respectively, object property information based on a characteristic of an application executed in an activated window among the plurality of windows, and configuring and displaying an object for controlling the application executed in the activated window based on the object property information.

According to various embodiments of the present disclosure, the method may further include creating, while displaying an execution screen of an identical application in a plurality of windows, object property information based on a characteristic of the application, and configuring and displaying an object for controlling the application based on the object property information.

According to various embodiments of the present disclosure, the method may further include displaying one or more items contained in the object, and when an input for selecting a specific application is detected after a specific item is selected from one or more items contained in the object, performing a function corresponding to the specific item in the specific application.

According to various embodiments of the present disclosure, the method may further include creating, while displaying a plurality of applications in a plurality of windows, respectively, a plurality of pieces of object property information based on characteristics of the plurality of applications, and configuring and displaying an object for controlling the plurality of applications based on the plurality of pieces of object property information.

According to various embodiments of the present disclosure, the displaying of the object may include distinguishably arranging and displaying a plurality of items contained in the object for controlling the plurality of applications, based on at least one of shapes, sizes, colors, and locations thereof according to the plurality of pieces of object property information.

According to various embodiments of the present disclosure, the method may further include identifying, while executing the application, one or more hold detection signals, and distinguishably displaying the object in one or more partial areas of the display module that correspond to the one or more hold detection signals.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display functionally connected to the electronic device; and
at least one processor configured to:
  detect a characteristic of an application and create object property information using the characteristic of the application in response to execution of the application,
  configure an object for controlling at least one function of the application using the object property information and the characteristic of the application, while the application is executed,
  change a shape and a position of the object for displaying the object on the display based on the characteristic of the application, and
  display the object with the changed shape on the changed position while the application is executed.

2. The electronic device of claim 1, wherein the object property information comprises at least one of the shape of the object, a number of items contained in the object, functions of the items contained in the object, or a location of the object.

3. The electronic device of claim 1, wherein, when a second function is changed and executing while a first function of the application is executed, the at least one processor is further configured to:
  create another object property information based on the second function, and
  configure and display another object for controlling at least one function of the application based on the object property information.

4. The electronic device of claim 1, wherein, when an event occurs while the application is executed, the at least one processor is further configured to:
  create another object property information based on information of the event, and
  configure and display another object for controlling the event based on the object property information.

5. The electronic device of claim 1, wherein, while execution screens of a plurality of applications are displayed in a plurality of windows, respectively, the at least one processor is further configured to:
  create another object property information based on a characteristic of an application executed in an activated window among the plurality of windows, and
  configure and display another object for controlling the application executed in the activated window based on the other object property information.

6. The electronic device of claim 1, wherein, while displaying an execution screen of an identical application in a plurality of windows, the at least one processor is further configured to:
  create another object property information based on a characteristic of the identical application, and
  configure and display another object for controlling the identical application based on the other object property information.

7. The electronic device of claim 6, wherein, when an input for selecting a specific application is detected after a specific item is selected from at least one item contained in the other object, the at least one processor is further configured to perform a function corresponding to the specific item in the specific application.

8. The electronic device of claim 1, wherein, while displaying a plurality of applications in a plurality of windows, respectively, the at least one processor is further configured to:
  create a plurality of pieces of object property information based on the characteristics of the plurality of applications, and
  configure and display another object for controlling the plurality of applications based on the plurality of pieces of object property information.

9. The electronic device of claim 8, wherein the at least one processor is further configured to distinguishably arrange and display a plurality of items contained in the other object for controlling the plurality of applications, based on at least one of shapes, sizes, colors, or locations thereof according to the plurality of pieces of object property information.

10. The electronic device of claim 1, wherein, while executing the application, the at least one processor is further configured to:
  identify at least one hold detection signal, and
  distinguishably display the object in at least one partial area of the display that correspond to the at least one hold detection signal.

11. A method of controlling an object in an electronic device, the method comprising:
  detecting a characteristic of an application and creating object property information using the characteristic of the application in response to execution of the application;
  configuring the object for controlling at least one function of the executed application using the object property information and the characteristic of the application, while the application is executed;
  changing a shape and a position of the object for displaying the object on a display based on the characteristic of the application; and
  displaying the object with the changed shape on the changed position while the application is executed.

12. The method of claim 11,
  wherein the object property information comprises at least one of the shape of the object, a number of items contained in the object, functions of the items contained in the object, or a location of the object.

13. The method of claim 11, further comprising:
  creating, when a second function is changed and executing while a first function of the application is executed, another object property information based on the second function; and
  configuring and displaying another object for controlling at least one function of the application based on the object property information.

14. The method of claim 11, further comprising:
  creating, when an event occurs while the application is executed, another object property information based on information of the event; and
  configuring and displaying another object for controlling the event based on the object property information.

15. The method of claim 11, further comprising:
  creating, while execution screens of a plurality of applications are displayed in a plurality of windows, respectively, another object property information based on a characteristic of an application executed in an activated window among the plurality of windows; and
  configuring and displaying another object for controlling the application executed in the activated window based on the other object property information.

16. The method of claim 11, further comprising:
  creating, while displaying an execution screen of an identical application in a plurality of windows, another object property information based on a characteristic of the application; and
  configuring and displaying another object for controlling the application based on the other object property information.

17. The method of claim 16, further comprising:
  displaying at least one item contained in the object; and
  performing, when an input for selecting a specific application is detected after a specific item is selected from at least one item contained in the object, a function corresponding to the specific item in the specific application.

18. The method of claim 11, further comprising:
  creating, while displaying a plurality of applications in a plurality of windows, respectively, a plurality of pieces of object property information based on characteristics of the plurality of applications; and
  configuring and displaying an object for controlling the plurality of applications based on the plurality of pieces of object property information,
  wherein the displaying of the object comprises distinguishably arranging and displaying a plurality of items contained in the object for controlling the plurality of applications, based on at least one of shapes, sizes, colors, or locations thereof according to the plurality of pieces of object property information.

19. The method of claim 11, further comprising:
  identifying, while executing the application, at least one hold detection signal; and
  distinguishably displaying the object in one or more partial areas of the display that correspond to the at least one hold detection signal.

20. A non-transitory computer-readable storage medium storing instructions that, when executed, cause at least one processor to perform the method of claim 11.

* * * * *